United States Patent [19]

Garves

[11] Patent Number: 5,054,927
[45] Date of Patent: Oct. 8, 1991

[54] APPARATUS AND METHOD FOR DETERMINING THE THICKNESS OF INSULATED GLASS

[76] Inventor: John C. Garves, 15601 Bondy La., Darnestown, Md. 20878

[21] Appl. No.: 553,423

[22] Filed: Jul. 17, 1990

[51] Int. Cl.$^5$ .............................................. G01B 11/06
[52] U.S. Cl. .................................................. 356/382
[58] Field of Search ...................... 356/3, 20, 381, 382; 65/29

[56] References Cited

U.S. PATENT DOCUMENTS

| | | | |
|---|---|---|---|
| 1,503,543 | 8/1924 | Lytle | 356/382 |
| 1,756,785 | 4/1930 | Gallasch | 356/382 |
| 3,125,624 | 3/1964 | Illig et al. | |
| 3,257,895 | 6/1966 | Garraway | |
| 3,320,849 | 5/1967 | Cumberland | 356/382 |
| 4,453,828 | 6/1984 | Hershel et al. | 356/382 |
| 4,848,913 | 7/1989 | Greiner | 356/382 |

Primary Examiner—F. L. Evans
Attorney, Agent, or Firm—James Creighton Wray

[57] ABSTRACT

A light source projects a light beam through an insulating multiple glass sheet insulating unit. The size of the beam spot on a target indicates unit thickness.

18 Claims, 4 Drawing Sheets

APPARATUS AND METHOD FOR DETERMINING THE THICKNESS OF INSULATED GLASS

BACKGROUND OF THE INVENTION

This invention is directed to the measurement of thicknesses of insulating glass units.

Thicknesses of installed glass units are the most perplexing problem to glass replacements specialists and estimators.

When estimating replacement of insulated glass units having broken or damaged glass or seals, cost may vary widely according to the thicknesses of the glass units. Fixed estimates may result in reduction or loss of profits, or in actual negative profits. Overestimations may result in loss of contract awards and reduction of jobs.

When a job is awarded based on an estimate, the estimators measurements of thickness and areas may be accepted, or a skilled glass installer may remeasure the job for precise requirements when ordering materials. While the square areas may be measured with precision, it is often difficult to measure glass thicknesses with the same precision. If the thickness is miscalculated, losses may be incurred when ordering nonreturnable special sizes, or when ordering wrong standard sizes. Delays are encountered and installation expenses are increased when insulating units of the wrong thickness are assembled and delivered to job sites.

Calipers have been available to measure glass thickness, but the calipers are limited in lateral expanse. Many buildings with insulated glass do not have windows that open to permit insertion and engagement of the calipers, and thus the calipers are useless. Many doors are separated from windows by greater dimensions than the length of the calipers, again rendering the calipers useless.

Devices with mirrors on opposite sides of the window and viewing scopes for looking through the window toward a mirror at predetermined angles and lining up marks on the angular devices have been offered with mixed reception. Difficulties of seeing images in the devices and understanding the use of the devices sufficiently to avoid mistakes in their use have prevented widespread acceptance or use of such devices.

A need persists for a simple device with simple indications that can be easily and assuredly read for measuring thicknesses of insulating glass units.

SUMMARY OF THE INVENTION

The present invention is directed to providing a simple, easily readable device. The present invention uses a standardized light source on a first outer glass surface, and a standardized target on a second opposite outer glass surface.

Readings are taken directly from the light source or directly from the target, which indicate the thickness of the insulating glass unit between the first and second outer glass surfaces.

One of the problems in measuring unit thickness of the insulating glass units is that individual sheets of glass within the units have varied thicknesses. Usually both sheets are of equal thickness, but the sheets may be of single strength, double strength, 3/16" or ¼" glass sheet thicknesses. The exact thicknesses of the glass sheets may be determined using a thickness card held at a 45° angle against the glass sheet.

The thickness of the glass sheet is not indicative of the distance between the glass sheets. Distance between the sheets is independent of the thicknesses of the individual sheets.

One of the problems encountered in the measurement of total unit thickness is the different refraction in units having glass of different thickness. The present invention solves the problem of varied refraction, and uses the varied refraction in the total unit thickness measurement.

A light source projects a light beam through an insulating multiple glass sheet insulating unit. The size of the beam spot on a target indicates unit thickness.

The glass thickness measurement apparatus is a target having plural parallel lines for mounting on an outer glass surface of an insulated glass unit. A standard light source having a hood is positioned on a second outer surface of the insulated glass unit opposite the target. A scale is provided either on the hood or target, wherein variations in the thickness between the first and second outer glass surfaces of the insulated unit are noted by comparing the dispersion and refraction of light from the light source through the glass and onto the target.

In one embodiment, the target includes at least one base line and plural boxes for bracketing a light spot projected from the light source through the glass to the target. Alternatively, the target can incorporate plural parallel base lines, each being associated with a particular thickness of glass sheets within the insulated unit. In cooperation with the plural base lines, the target has a plurality of parallel rectangular boxes, each associated with a particular thickness between outer surfaces of the glass in the insulated unit. The base lines can be straight lines, which are placed relatively far from the rectangles, wherein the base lines for thicker glass are placed closer to the rectangles associated with the respective unit thicknesses.

The light source and shroud project a circular light spot through the glass to the target, wherein a light spot is projected from the light source through the glass to the target. A first edge of the spot rests on a base line of the target and a second edge rests within an area circumscribed by target lines indicative of unit thickness between the first and second opposite surfaces of the glass unit.

Also disclosed is a method for measuring thickness between first and second outer surface of an insulated glass unit, wherein a light source having a shroud is positioned against a first outer glass surface of the light unit for projecting a light beam through glass sheets in the unit. The projected light falls upon a target positioned on the second outer glass surface of the unit, thus producing a spot on the target. The target has a plurality of graduated marks for indicating a size of the light spot, thereby indicating a thickness of the glass unit between the first and second surfaces.

In an alternate embodiment, the shroud can include an adjustment for positioning the light source at variable positions from the first glass surface.

The adjustment means incorporates marks related to a distance of the light source from the first glass surface for use with a measurement of the thickness between the first and second surfaces. The adjustable shroud varies the light beam passing from the shroud through the first and second glass surfaces and through the insulated unit, thus varying a size of the spot on the target. The shroud is adjustable perpendicularly with respect to the first glass surface.

Specifically, the shroud can incorporate a fixed ring portion and a movable ring portion, wherein plural marks on at least one of the ring portions allow alignment as an indication of the adjustment of the ring portions to thereby measure distance of the light source from the first glass surface and further, the glass thickness.

These and further and other objects and features of the invention are apparent in the disclosure, which includes the above and ongoing written specification, with the claims and the drawings.

DETAILED DESCRIPTION OF THE DRAWINGS

Figure 1:
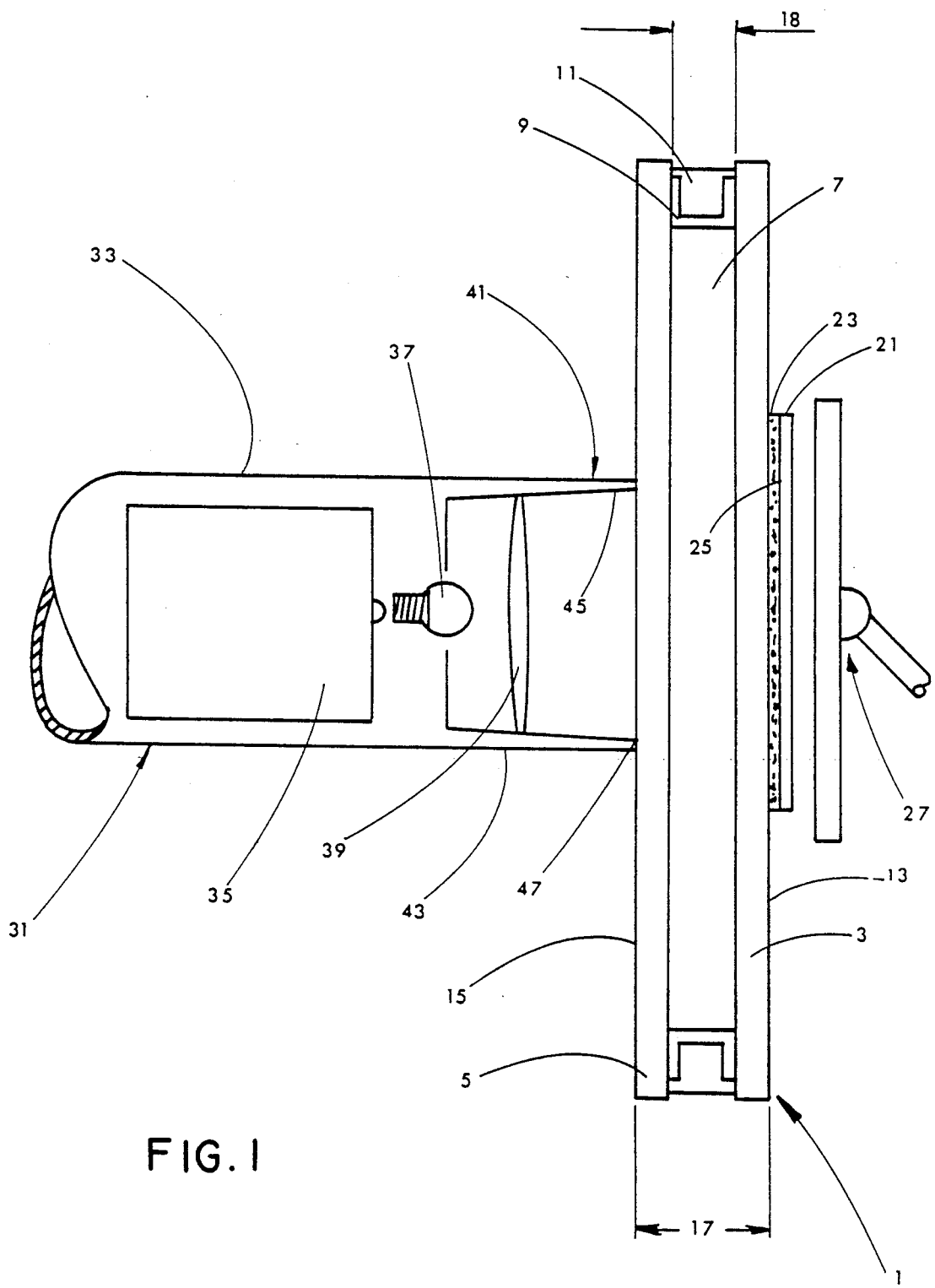
FIG. 1 is a schematic representation of a measuring system with a controlled light source on one side of an insulating window unit, and a target on the other side of the unit.

Referring to FIG. 1, an insulating glass unit is often made with parallel sheets of glass with an intermediate dry air or gas filled space. The edges of the precut sheet are sealed and held together with polysulfide or silicone or hot butyl bonding material, and an aluminum spacer holds the glass sheets apart uniformly around the edges of the sheets.

In FIG. 1, the insulating glass unit is generally indicated by the numeral 1. Glass sheets 3 and 5 are uniformly spaced on opposite sides of an air space 7. An aluminum channel spacer 9 holds the sheets a precise distance apart and a peripheral seal 11 is formed of vinyl. The insulating glass unit has outer glass surfaces 13 and 15. The purpose of the present invention is to measure the difficult to determine distance 17 between the flat glass outer surfaces 13 and 15. Further the present invention makes it possible to measure the distance 18 between inner surface 13 and 15 this distance is prescribed aluminum spacer 9 in FIG. 1. The system uses a target 21, which is adhered to one of the outer surfaces 13 with a bonding material 23 such as glue. The target preferably is a white thin plastic layer which is printed with offset printing indicia on a face 25 thereof, which is bonded to the glass surface. Alternatively, the target may be printed on a good quality paper which would adhere to the glass. Targets may be mounted on thin plexiglass.

The particular bonding material 23 may be any suitable bonding material which will hold the target on the glass surface 13 for a time sufficiently long to make an accurate thickness reading. The bonding material 23 may be a permanent bonding material in the case where the particular measured window is intended to be removed from the structure and replaced by another window.

In tall buildings the target may be applied with a long handled applicator 27, which may reach to the second or third floor windows from outside of the building. The target may be held on the applicator by suction and removed from the applicator by moving the applicator laterally across the target, or by releasing the suction. Preferably the target is smooth on the window.

In conventional high rise office buildings insulating glass units are constructed with uniform thickness throughout so that measuring the thickness of the glass on the ground floor or on the second floor is a valid indicator of the thickness of glass in other parts of the building.

The target 21 may be placed on an interior outer glass surface such as 15, and the control light source 31 may be focused on the target from an exterior side of the unit. It is usual to place the target on the exterior and the light source 31 on the interior. The opposite may be true. The light source has a conventional flashlight body 33 with plural 1½ volt cells 35, which illuminate a screwed-in lamp 37, to shine light through a focusing lens 39. Preferably lens 39 is selected so that the edges of the beam from the light source 31 are sharp at a distance from the light bulb 37 equal to the distance between the lens 39 and the outer glass surface 15 plus the general thickness range between outer glass surfaces 13 and 15 in insulating glass units 1 to be measured. Light source 31 has a control shroud 41 with a generally straight walled usually cylindrical outer surface 43 and a slightly tapered inner surface 45 leading to a circular edge 47.

Figure 2A:
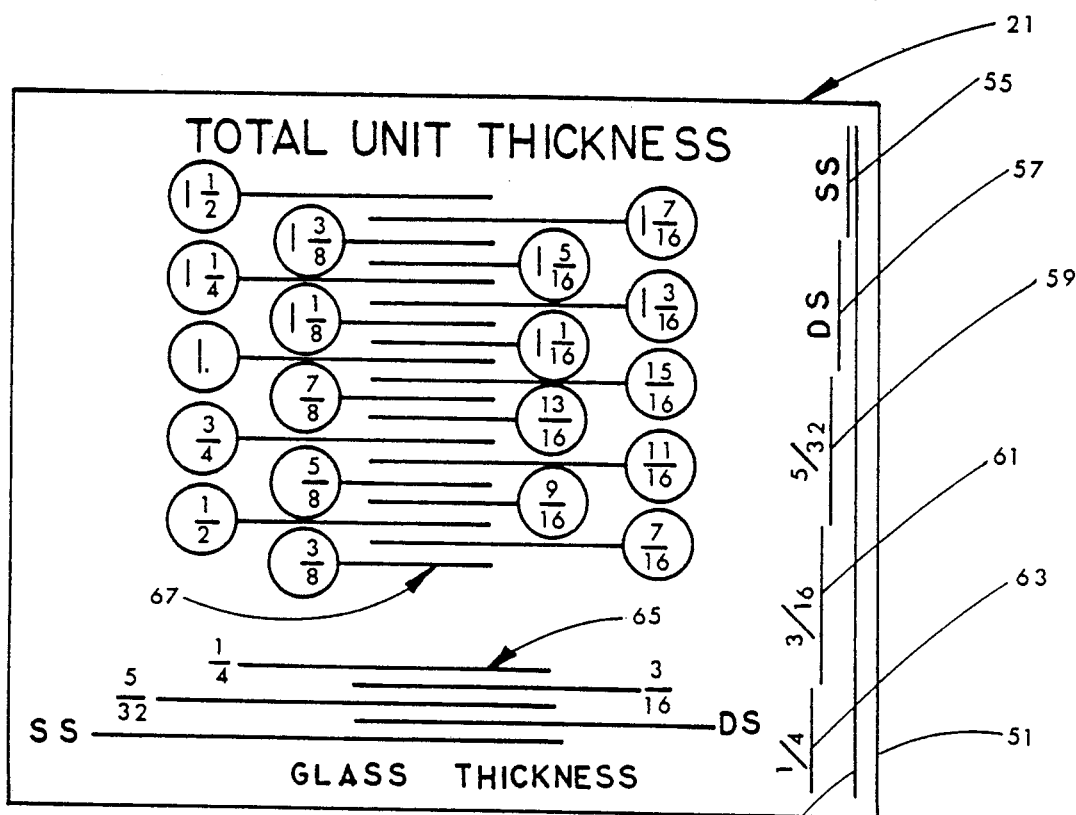
FIGS. 2A, 2B and 2C are details of preferred targets.

Referring to FIG. 2, a preferred target is generally indicated by the numeral 21. The face of the target has a number of markings.

To first determine the thickness of each glass sheet, edge 51 is held against a glass surface with the target at about a 45° angle. An image is reflected by the glass showing the base line 53 and the thickness lines 55, 57, 59, 61 and 63. One of the latter lines 55-63 will be superimposed on the line 53 in the image. The particular line 55-63 that is superimposed on the base line 53 indicates the thickness of glass, 55 single strength, 57 double strength, 59 5/32", 61 3/16" and 63¼" thickness. The reverse printed numbers are readable in the reflection. The target 21 is then adhered to the outer surface of the insulating glass unit. The flashlight 31 is held against the inner surface of the insulating glass unit 1, as shown in FIG. 1, and the circular spot of the flashlight which shines through the glass unit and falls on the target is moved by moving the flashlight so that the edge of the circular spot formed by the beam rests against one of the lines in the group of lines 65 which corresponds to the measured single sheet thickness. Care is taken so that the lower edge of the circular spot rests upon or just contacts the selected line in the group of lines 65, but is not buried in that line. The diametrically opposite edge of the circular beam will fall on one of the group of lines generally indicated by the numeral 67. The edge of the spot falling on a particular line indicates the overall thickness of the glass insulating unit. For example, if the edge of the circular spot falls on the line labelled ¾ or contacts the upper or lower surface of that line, the overall thickness between the outer surfaces 13 and 15 of the insulating glass unit 1 is ¾".

In an example, the target 21 is held at a 45° angle with edge 51 resting against a glass. The reflected image from the glass produces double images of each of the lines 53-63. It is found that one of the images of the line 57 overlies one of the images of the line 53. That alignment indicates that the glass is a double strength glass. Target 21 is fixed to an outer surface 13 of the insulating glass unit 1, and the flashlight is pressed against the glass so that edge 47 rests upon the surface 15 of the glass.

The flashlight is moved so that the beam touches line DS in the group of lines 65. The upper edge of the circular spot falls on a line opposite the ⅝" mark. That indicates that the total overall thickness between outer surfaces of the glass insulating unit is ⅝". An estimator circles the reverse DD by line 57 and the DD at the right end of the group of lines 65, and circles the ⅝ in the group of lines 67 on a copy of the target 21, which is attached to the estimator's report.

Figure 2B:
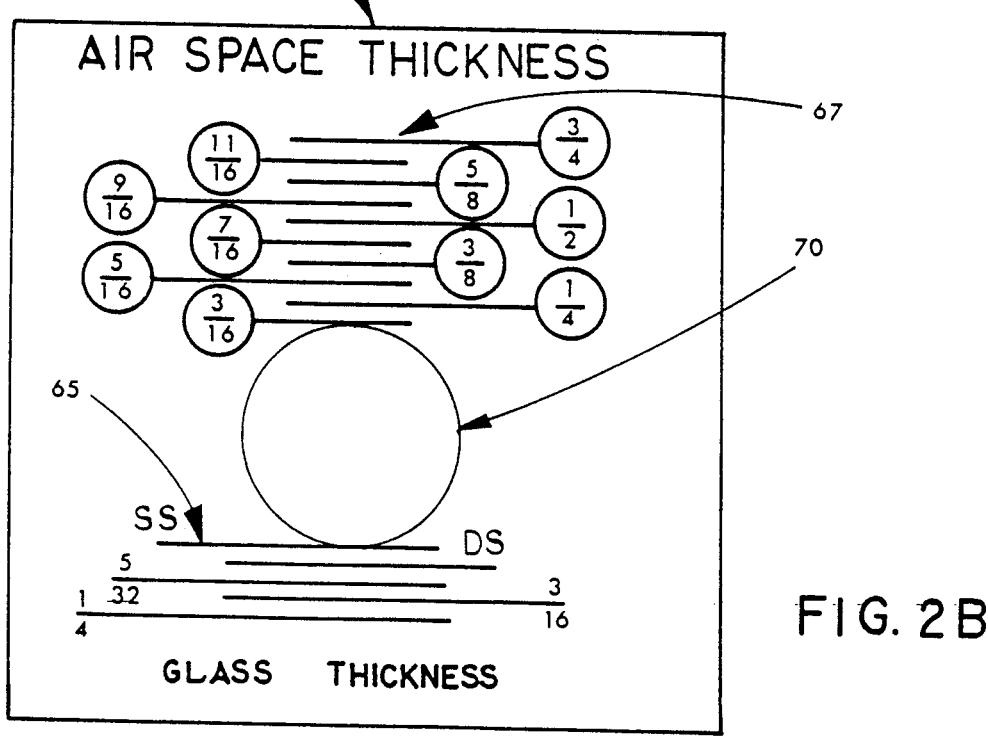

An alternate target 21B is shown in FIG. 2B, which shows a spot 70 of a flashlight beam having a lower edge aligned on the "SS line" corresponding to the predetermined glass thickness in group 65 of lines. An upper edge of the circular spot 70 falls on the line in the group of lines 67 opposite the ⅜ notation, indicating that the thickness of the spacer is ⅜".

Figure 3:
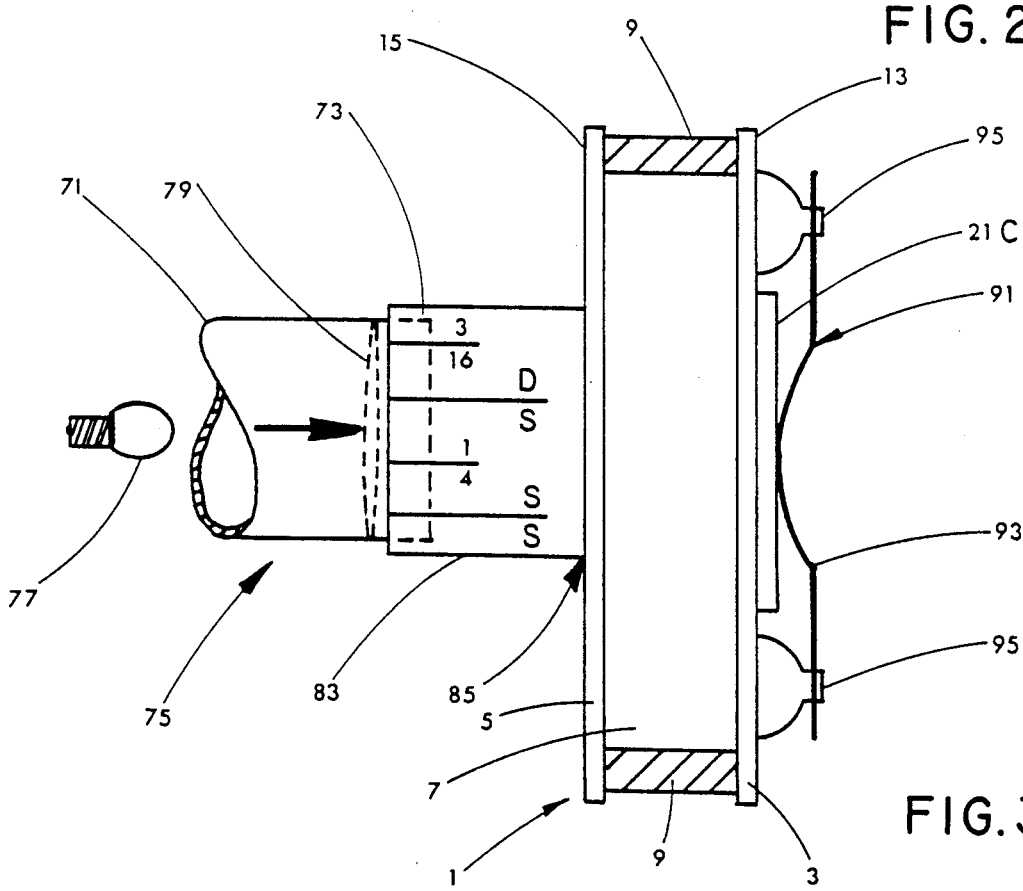
FIG. 3 is a schematic representation of an adjustable sleeve for use with a controlled light source, showing the positioning of the sleeve on the insulated glass unit opposite the target.
Figure 4:
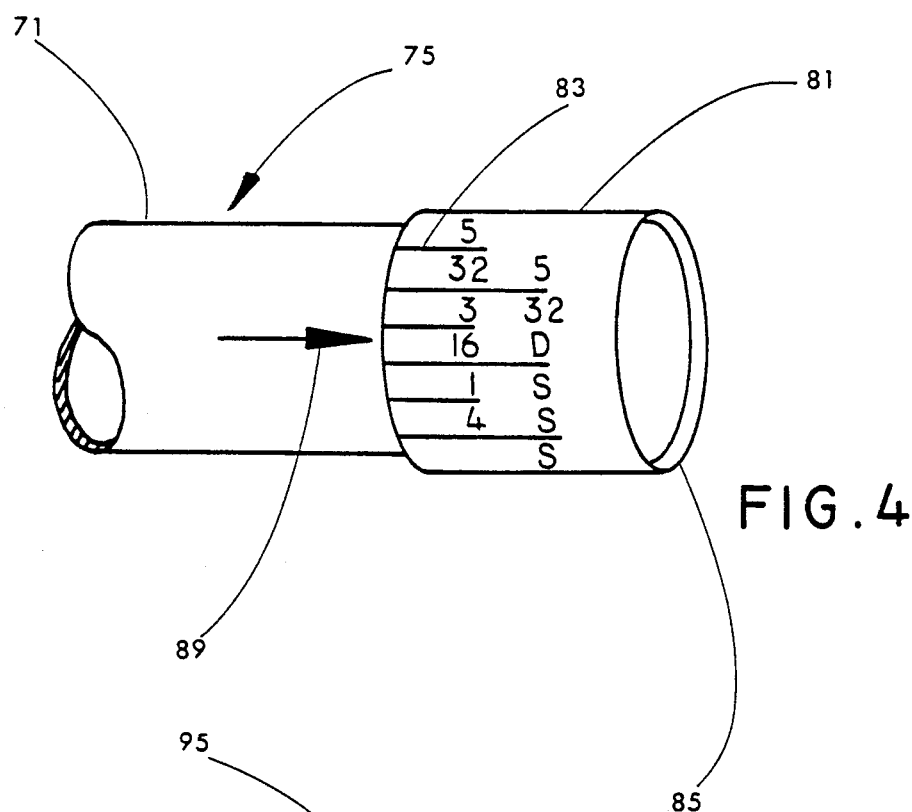
FIG. 4 is a schematic detail of markings on the sleeve.

Gauge 21C is used with the adjustable light source shown in FIGS. 3 and 4. The group of lines 65 has been replaced by a single line 65C.

The spaced parallel lines may be replaced by boxes, circles or other geometric shapes.

Figure 2C:
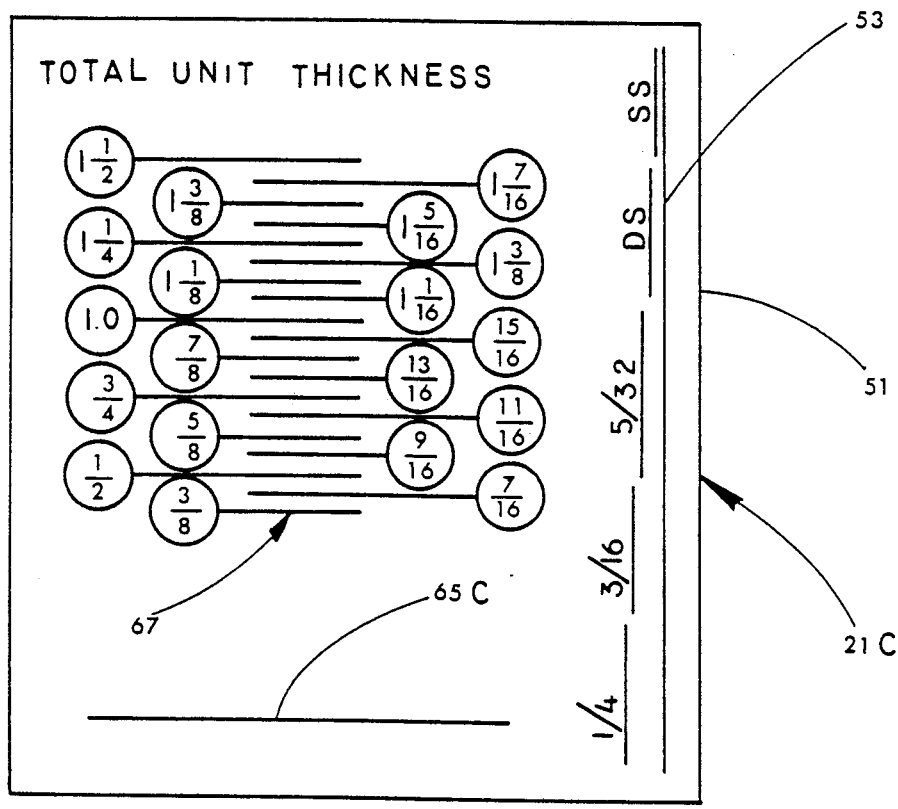

A gauge embodiment shown in FIG. 3 uses a standard target 21C, which has spaced parallel lines. An insulated glass unit 1 has an outer surface 13 on one side, and an outer surface 15 on another side. A light source 75 has a bulb 77 and a lens 79. An outer end of the body 71 has external threads 73, and an inner surface of an adjustable sleeve 81 is threaded with complementary threads. Turning the adjustable sleeve 81 moves lens 79 and light source 77 closer to or further away from edge 85 and surface 15. The sleeve 81 is turned until the lines 87 relating to the premeasured glass thickness using the edge 51 of target 21 aligns with the index line 89 on body 71. The beam is shined through the unit 1 and the source is slid along face 15 until an edge of the light spot rests on line 65C. As shown in FIG. 4, marks 87 on the sleeve or collar 81 indicating the thickness of the glass are aligned with index 89 on the body 71 of the light source before shining the light beam on target 21C, as shown in FIG. 2C. The overall thickness is read from the group of lines 67.

In an alternate form of the invention, horizontal marks on body 71 align with an edge 83 of the sleeve 81 to provide an alternate form of a direct-reading thickness indication.

Figure 5:
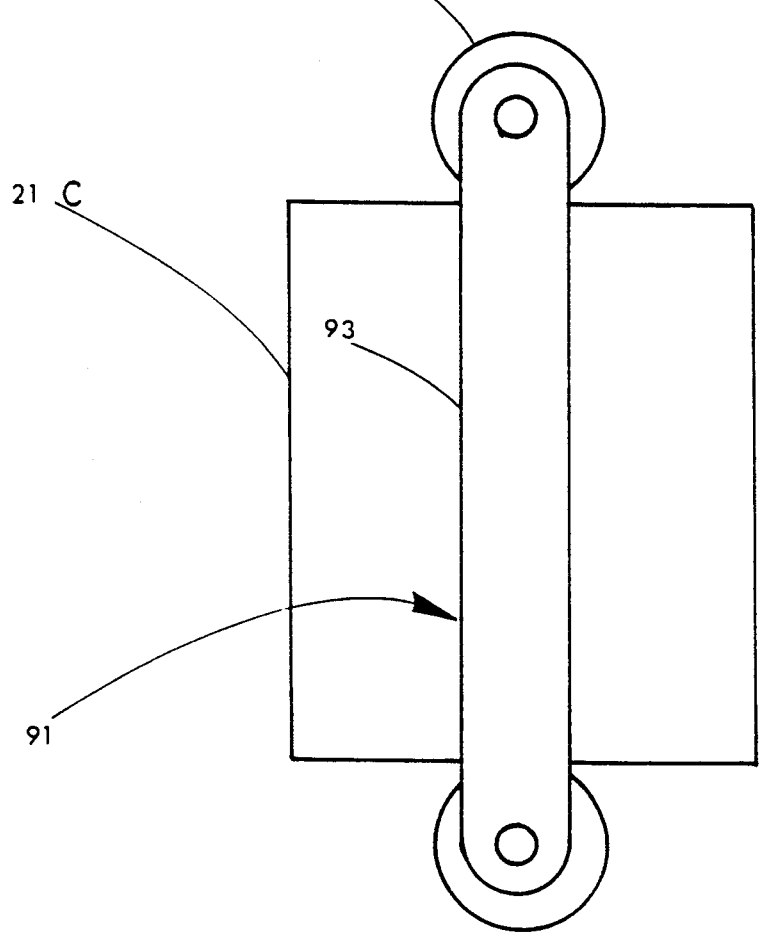
FIG. 5 is a detail of a target clamp.

As shown in FIG. 5, a target card 21 may be mounted on a glass surface 13 using a spring clamp 91 with a leaf spring 93 held between two suction cups 95.

Spring clamp 91 may be used with a rigid card stock target or may be used with a flexible film target when a backing plate is attached to the clamp spring 93.

While the invention has been described with reference to specific embodiments, modifications and variations of the invention may be constructed without departing from the scope of the invention, which is defined in the following claims.

I claim:

1. Glass thickness measurement apparatus, comprising a target having plural parallel lines representing thickness for mounting on an outer glass surface of an insulated glass unit, a light source having a hood for positioning on a second outer surface of the insulated glass unit opposite the target, and a scale on the target comprising the parallel lines for indicating the thickness between the first and second outer glass surfaces of the insulated unit.

2. The apparatus of claim 1, wherein the target scale includes at least one base line and plural unit thickness indicating lines for bracketing between base and indicating lines a light spot projected from the light source through the glass to the target.

3. The apparatus of claim 2, wherein the target scale has plural parallel base lines, each being associated with a particular thickness of glass sheets within the insulated unit.

4. The apparatus of claim 3, wherein the target scale plural parallel lines comprise a plurality of parallel unit thickness lines, each associated with a particular thickness between outer surfaces of the glass in the insulated unit.

5. The apparatus of claim 3, wherein the base lines are straight lines.

6. The apparatus of claim 3, wherein the base lines for thin glass are placed relatively far from the unit thickness indicating lines, and wherein the base lines for thicker glass are placed closer to the lines associated with the respective unit thicknesses.

7. The apparatus of claim 1, wherein the light source and a hood project a circular light spot through the glass to the target.

8. The apparatus of claim 1, wherein the parallel lines comprise a base line and unit thickness indicating lines and further comprising a light spot projected from the light source through the glass to the target, the light spot having a first edge resting on the base line and having a second edge resting on one of the lines indicative of unit thickness between the first and second opposite glass surfaces of the glass unit.

9. The apparatus of claim 8, wherein the target comprises a second base line, each base line associated with glass sheets of particular distinct thickness, and plural unit thickness lines, each associated with a distinct glass unit thickness.

10. Apparatus for measuring thickness between first and second outer surfaces of an insulated glass unit, comprising a light source having a shroud for positioning against a first outer glass surface of the insulated unit for projecting a light beam through glass sheets in the unit, a target positioned on the second outer glass surface of the unit for receiving the light beam, which produces a spot on the target, the target having a plurality of graduated marks for indicating a size of the light spot and thereby indicating a thickness of the glass unit between the first and second surfaces.

11. The apparatus of claim 10, wherein the shroud includes an adjustment for positioning the light source at variable positions from the first glass surface.

12. The apparatus of claim 11, wherein the adjustment has marks related to a distance of the light source from the first glass surface for use with a measurement of the thickness between the first and second surfaces.

13. The apparatus of claim 10, wherein the shroud is adjustable for varying the light beam passing from the shroud through the first and second glass surfaces and through the insulated unit, and varying a size of the spot on the target.

14. The apparatus of claim 13, wherein the shroud is adjustable perpendicularly with respect to the first glass surface.

15. The apparatus of claim 14, wherein the shroud comprises a fixed ring portion and a movable ring portion, and further comprising plural marks on at least one of the ring portions for aligning the marks with a fixed mark as an indication of the adjustment of the ring portions and distance of the light source from the first glass surface and for indicating glass thickness.

16. Apparatus for measuring thickness of a transparent body, comprising a light source on one side of a glass panel for producing a controlled light beam and a target having spaced lines mounted on a second opposite side of the glass panel for engaging by the beam and indicating thickness of the transparent body.

17. The apparatus of claim 16, wherein the spaced lines on the target measure distance between inner surfaces of glass sheets and thus measure air space between the glass sheets.

18. Apparatus for measuring thickness between first and second outer surfaces of an insulated glass unit, comprising a light source having a shroud for positioning against a first outer glass surface of the insulated unit for projecting a light beam through glass sheets in the unit, a target positioned on the second outer glass surface of the unit for receiving the light beam, which produces a spot on the target, the target having a plurality of graduated marks for indicating a size of the light spot and thereby indicating a thickness measuring distance. between inner surfaces of glass sheets and thus measuring air space between the glass sheets.

* * * * *